FIG. 1

INVENTOR.
WILLIAM E. BRANDAU

Sept. 17, 1957 W. E. BRANDAU 2,806,352
FUEL CONTROL SYSTEM RESPONSIVE TO ENGINE
TEMPERATURE AND SPEED CONDITIONS
Filed Sept. 28, 1951 3 Sheets-Sheet 3

INVENTOR.
WILLIAM E. BRANDAU
BY
*Herbert L. Davis Jr.*
ATTORNEY

United States Patent Office 2,806,352
Patented Sept. 17, 1957

2,806,352

FUEL CONTROL SYSTEM RESPONSIVE TO ENGINE TEMPERATURE AND SPEED CONDITIONS

William E. Brandau, Westwood, N. J., assignor to Bendix Aviation Corporation, Teterboro, N. J., a corporation of Delaware Application September 28, 1951, Serial No. 248,672

15 Claims. (Cl. 60—39.28)

The present application includes subject matter disclosed and claimed therein common to that disclosed in a prior copending U. S. application Serial No. 156,260 filed April 17, 1950 by William E. Brandau now Patent No. 2,727,356, issued December 20, 1955, and in which prior application the claimed subject matter has been restricted to an engine starting device, the disclosure of which is common to the engine starting device disclosed in the present application. The present application relates to a fuel control system for an aircraft engine including turbines for driving a propeller of the aircraft. The fuel supplied to the combustion chamber of each exhaust gas driven turbine is regulated by a fuel control device or valve operated by a novel combustion gas temperature and engine speed sensing regulator system.

More particularly, the invention relates to improvements in and specific electrical, electronic and mechanical means for control systems such as appear in copending application Serial No. 40,937 filed July 27, 1948 by William E. Brandau now Patent No. 2,694,900 issued November 23, 1954, application Serial No. 41,329 filed July 29, 1948, by William E. Brandau, and application Serial No. 90,453 filed April 29, 1949, by William E. Brandau, all of which applications are assigned to Bendix Aviation Corporation.

An object of the invention is to provide a basic temperature control circuit including a null seeking loop producing a temperature signal balanced against a selector voltage determined by the position of a power selector lever and which is monitored and corrected by the operation of a compressor stall computer.

Another object of the invention is to provide such a full floating loop biased by an off-speed coupling to give speed temperature interaction stability, a fuel valve follow-up and reset combination to produce critical temperature damping, and an over-and-under-speed signal which acts both to aid the propeller speed selector mechanism and also to reset the temperature setting for ground operational idle speeds and permitting the scheduling of minimum combustion temperatures for airborne approaches.

Another object of the invention is to provide a control system in which for starting the engine, ground idling operation of the engine, and reverse propeller pitch operation, the control may be changed by manual switching (as a speed selector lever is manually positioned from its maximum speed setting position) to an entirely separate speed control system including a null-seeking loop of selector voltage, speed signal and valve follow-up voltage (without reset in this case in order to maintain a balance between the two power sections) which acts through a phase selector to saturate and override any existing temperature error signal. The action of the phase selector, however, is such that underspeed signals are blocked and the increase fuel voltage reaches the servomotor only in the form of an under temperature signal so that all operation of the speed circuit will be monitored during accelerations by the temperature setting and the stall computer.

Under the invention, in order to avoid the stall region of the compressor which varies with inlet temperature and compressor speed, there has been devised novel improved means including an inlet air temperature sensing device and a compressor speed sensing device which varies the maximum permissible temperature so as to avoid stall conditions in accordance with a predetermined schedule based on the characteristics of the particular engine to be controlled.

Another object of the invention is to provide a stall computer and reset which briefly are to determine the maximum permissible combustion temperature which may be maintained without compressor surge as a function of ram air temperature and turbine speed together with novel improved means to compare this temperature and (a) reduce the selected temperature accordingly, if it is too high, or (b) make no change if the selected operation is in a safe region.

Another object of this invention is to provide a stall computer system and actuator controlled thereby to adjust a rotor of a reset variable coupling transformer as required to maintain zero voltage around a reset loop and reduce the selected temperature to a value determined by the stall computer and in which the reverse action of increasing the selected temperature is prevented by incorporating a zero stop means for the rotor of the variable coupling transformer.

The above and other objects and features of the invention will appear more fully hereinafter from a consideration of the following description taken in connection with the accompanying drawings wherein one embodiment of the invention is illustrated by way of example.

Turbo-jet engine

Figure 1:
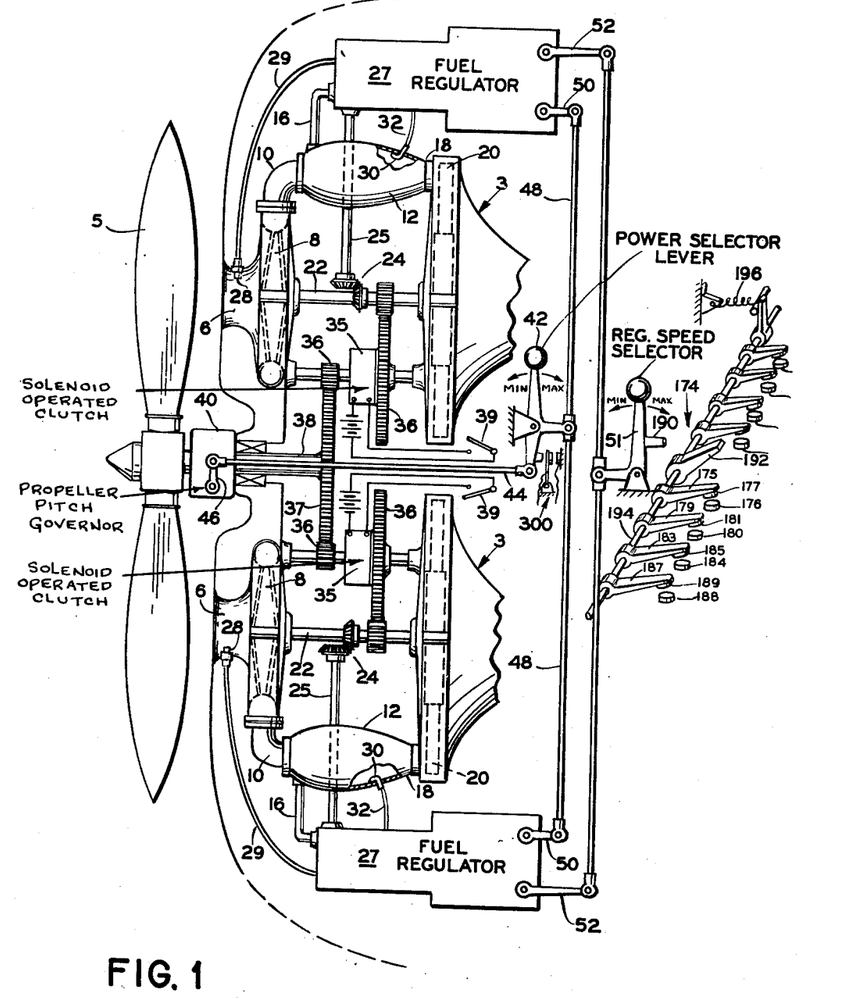
Figure 1 is a diagrammatic view of a typical turbine driven aircraft engine showing the take-off for the regulators of the respective turbines.

Referring to Figure 1, there is mounted within the body of an aircraft a pair of combustion gas driven turbines 3 for driving a propeller 5 of the aircraft as hereinafter explained.

This aircraft moves toward the left as viewed in Figure 1 so that ambient air is rammed into intakes 6. The air from the intake 6 is compressed by a blower or compressor 8 and flows through a conduit 10 into a combustion chamber 12. Fuel at a controlled rate is fed through a line 16 into the combustion chamber 12.

The products of combustion flow out through a nozzle 18 to drive a turbine wheel 20 which drives the compressor 8 through a shaft 22. Gearing 24 and a shaft 25 connect the turbine shaft 22 with the speed governor of the fuel regulator indicated generally by the numeral 27. Also controlling the fuel regulator is a temperature sensitive element 28 at the air inlet 6. As hereinafter explained, the element 28 may be a bimetallic element connected through a suitable flexible drive shaft 29 to the fuel regulator 27. Another temperature sensitive element 30 is suitably positioned in the combustion chamber 12 to sense the temperature of the combustion chamber gases. The element 30 may be a suitable thermocouple electrically connected by leads 32 to the fuel regulator 27 as hereinafter explained.

The drive shaft 22 is connected through a suitable solenoid operated clutch 35 and gearing 36 and 37 to a suitable drive shaft 38 for the propeller 5. The clutch 35 is controlled by a switch 39 controlling a circuit to energize the solenoid clutch 35 and effect a driving relation between the shaft 22 and the propeller shaft 38.

A propeller pitch governor 40 of conventional type controls the pitch of the blades of the propeller 5 so as to regulate the speed of the propeller to a predetermined value which may be selected by adjustment of a control lever 42 operably connected to the governor 40 through rod 44 connected to a speed setting arm 46 of the propeller pitch governor 40.

Selector lever 42 may be operated by the pilot in flight or by suitable automatic pilot control means.

The lever 42 is also operatively connected through linkage 48 to lever 50 of the fuel regulator 27 for selecting the temperature setting of the regulator for each turbine engine in coordination with the selected propeller speed as hereinafter explained.

There is further provided a manually operable lever 51 connected through suitable linkage to lever 52 of the fuel regulator 27 for selecting the speed setting of the regulator as hereinafter explained.

The turbo-prop fuel control system herein described serves to control the flow of fuel to the combustion chambers 12 of the two turbines jointly geared to run at the same speed and to drive a propeller 5 of an aircraft in which the speed of the propeller 5 is controlled by the separate propeller pitch governor 40 of conventional type.

A separate fuel regulator 27 is provided to control the flow of fuel to each combustion chamber in response to the combustion chamber temperature, turbine speed and other factors as hereinafter explained.

Fuel regulator

Figures 2, 3:
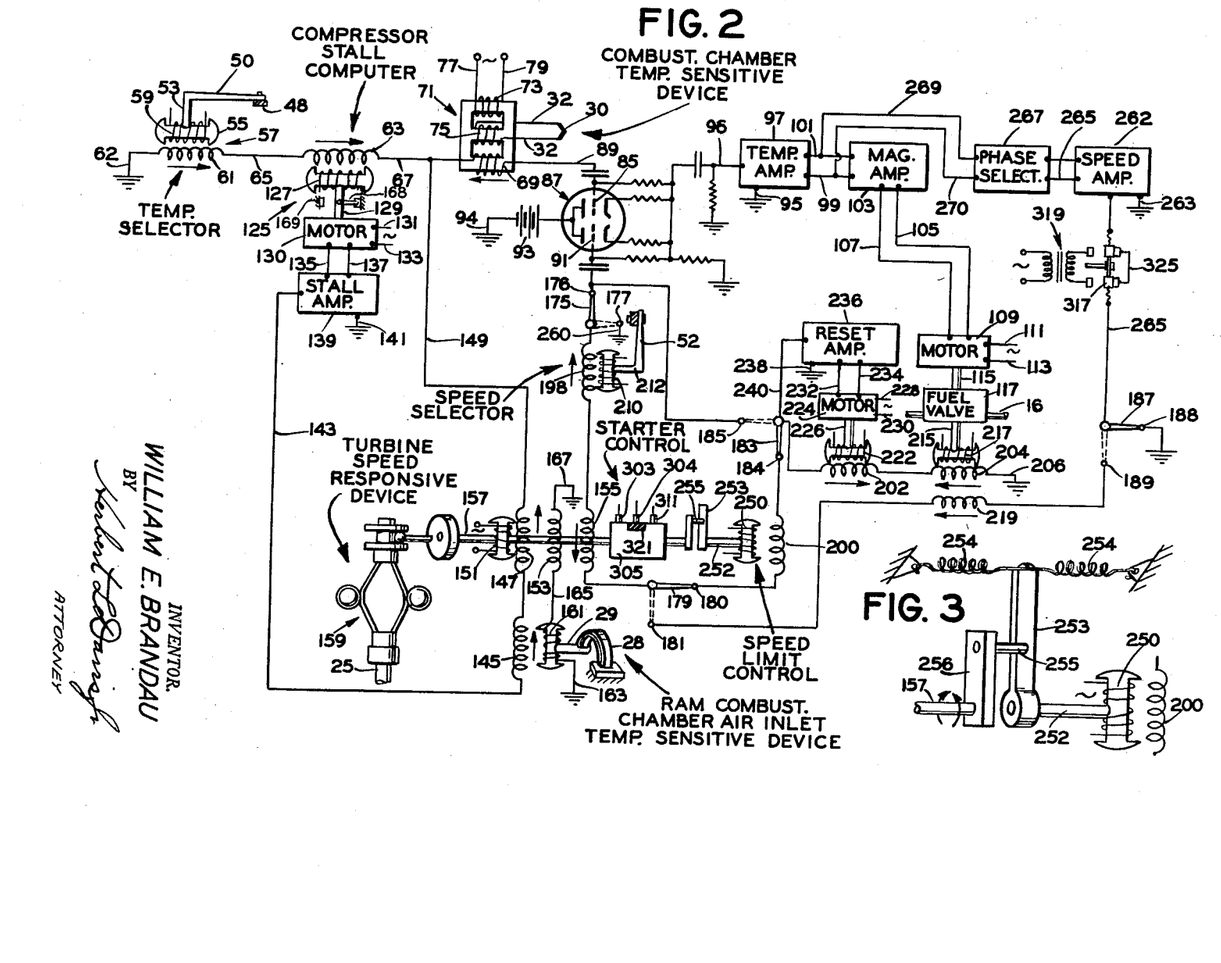
Figure 2 is a schematic diagram of the fuel regulator system for the combustion chamber of one of the turbines.
Figure 3 is a fragmentary schematic drawing of a speed limiting mechanism.

Referring to Figure 2, the regulator system is shown as including a basic temperature control circuit, the setting of which may be varied through adjustment of the manually operable power lever 42 and in which a temperature signal is balanced against a selector voltage which is monitored and corrected by the operation of a compressor stall computer. This full floating loop is biased by an off-speed coupling to give speed temperature interaction stability, a valve follow-up and reset combine to produce critical temperature damping and an over-and-under speed signal which acts both to aid the propeller pitch speed governor in preventing the speed from exceeding a predetermined maximum and also to reset the combustion temperature for ground idling operation thus permitting the scheduling of minimum combustion temperatures for airborne approaches.

For starting, ground idling operation and reverse propeller pitch operation, the control may be changed by a manually operable bank of switches (as the speed lever 51 leaves its maximum position) to an entirely separate speed control system including a null-seeking loop of selector voltage, speed signal and valve follow-up voltage (without reset in this case in order to maintain a balance between the two power sections) which acts through a phase selector to saturate and override any existing temperature error signal. The action of the phase selector, however, is such that underspeed signals are blocked and the increase fuel voltage reaches the servo motor only in the form of an under-temperature signal. Thus all operation on the speed circuit will be monitored during accelerations by the temperature setting and the stall computer.

Referring to the drawing of Figure 2, there is indicated by the numeral 50 the temperature selector lever operably connected through a shaft 53 to a rotor 55 of a variable coupling transformer 57. The rotor 55 has a winding 59 connected across a main source of alternating current having a constant frequency. The rotor winding 59 is inductively coupled to a stator winding 61. The coupling relation between the rotor and stator windings varies with the position of the control lever 50.

The winding 61 is grounded at one end by a conductor 62 and a stall computer output winding 63 is connected at the other end by a conductor 65 in series with the winding 61. The opposite end of the winding 63 is connected by a conductor 67 in series with a secondary winding 69 of a saturable reactor 71 having a primary winding 73 and a control winding 75. The primary winding 73 is connected by conductors 77 and 79 across the main source of alternating current. Output conductor 32 leads from the temperature probe or thermocouple 30 to the control winding 75. The temperature probe 30 may be of a conventional type or of a type such as shown and described in the U. S. Patent No. 2,483,350, granted September 27, 1949, to William R. Polye and William E. Brandau and assigned to Bendix Aviation Corporation.

As shown in Figure 1, the thermocouple 30 is positioned in the combustion chamber 12 and the amplitude of the voltage induced in secondary winding 69 by winding 73 is a function inversely of the amount of D. C. current fed to the control winding 75 by the thermocouple 30 in response to the temperature of the combustion gases in the combustion chamber 12. Thus, upon an increase in the temperature of the combustion gases in the chamber 12, the D. C. voltage across the line 32 of the saturating or control coil 75 increases causing in turn a decrease in the voltage induced in the secondary winding 69 by the primary winding 73, while a decrease in the temperature of the combustion gases in the combustion chamber effects an increase in the induced voltage in secondary winding 69.

The voltage induced in winding 69 is 180 degrees out of phase with that induced in the temperature selector winding 61 and that induced in the stall computer output winding 63 so that when out of balance a differential or signal voltage is applied to a control grid 85 of an electronic mixing tube 87 through a conductor 89. The voltage induced in winding 61 calls for a decrease in temperature and the voltage induced in winding 69 calls for an increase in temperature.

The mixing tube 87 is of the type having multigrids 85 and 91 and a common anode and a battery or source of plate voltage 93 ground connected at 94, all of which are well known in the art. The output of the mixing tube 87 is the resultant of the voltages applied to the respective grids 85 and 91 and the output of mixing tube 87 is applied through input conductor 96, ground connection 94 and a grounded input conductor 95 to an amplifier 97. The amplifier 97 may be of a conventional type or may be of a type such as shown and described in U. S. Patent 2,493,605, granted January 3, 1950, to Adolph Warsher and assigned to Bendix Aviation Corporation.

Output conductors 99 and 101 lead from the amplifier 97 to a magnetic amplifier 103 of conventional type or of a type such as shown, for example, in the U. S. Patent No. 2,432,036, granted December 2, 1947, to Paul A. Noxon and assigned to Bendix Aviation Corporation.

Output conductors 105 and 107 lead from the magnetic amplifier 103 to the control winding of a two phase motor 109. The other winding of the motor 109 is connected by conductors 111 and 113 across the main source of alternating current.

The motor 109 adjusts through a shaft 115 a fuel throttling valve 117 in a fuel conduit 16 to control the fuel supplied to the combustion chamber 12. The fuel throttling valve 117 may be of a conventional type or may be of a type such as disclosed and claimed in the copending application Serial No. 158,170, filed April 26, 1950, by Arnold H. Block now Patent No. 2,716,862 issued September 6, 1955, and assigned to Bendix Aviation Corporation.

Upon the temperature of the combustion chamber gases decreasing below that for which the temperature selector variable coupling transformer 57 is set, a differential signal voltage will be applied by the winding 69 to the grid 85 of the mixing tube 87 and from the output of the mixing tube 87 to the amplifier 97 and magnetic amplifier 103. The signal voltage will be impressed across the motor control lines 105 and 107 of such a phase as to cause rotation of the shaft 115 and adjustment of the fuel throttling valve 117 in a direction to increase the supply of fuel to the combustion chamber 12 to in turn increase the temperature of the combustion chamber gases to the selected value.

If the temperature of the combustion chamber gases increases above that for which the variable coupling transformer 57 is set, the signal voltage across lines 105 and 107 originating from the dominating differential signal voltage applied by winding 61 will have an opposite phase relation causing rotation of the motor 109 in an opposite direction to decrease the fuel supplied to the combustion chamber through the throttling valve 117 and thereby decrease the temperature of the combustion chamber gases to the selected value. It will be seen, then, that the voltage of the temperature selector variable coupling transformer 57 opposes that induced in the temperature responsive winding 69 and the predominating signal voltage, of course, controls the action of the motor 109 and tends to maintain the temperature selected through the variable coupling transformer 57 by the position of the pilot's control lever 42.

Stall computer

The function of the stall computer and reset indicated generally by the numeral 125 is briefly to determine the maximum permissible combustion temperature which may be maintained without compressor surge as a function of ram air temperature and turbine speed compared to the selected temperature and (a) reduce the selected temperature accordingly if it's too high or (b) make no change if the selected temperature is within a safe range.

Under the invention, in order to avoid the stall region of the compressor which varies with inlet temperature and compressor speed, there has been devised an inlet temperature sensing device and a compressor speed sensing device which varies the maximum permissible temperature so as to avoid stall conditions in accordance with a predetermined schedule. This schedule, of course, is dependent upon the characteristics of the particular engine to be controlled.

The schedules generally follow a given pattern so that as inlet temperature increases, the temperature sensing device tends to increase the ceiling temperature or maximum permissible combustion chamber temperature. However, as the speed of the compressor increases from idling to full throttle, the speed sensing device first tends to decrease the ceiling or maximum permissible temperature and then tends to increase the ceiling or maximum permissible temperature as full throttle is approached in accordance with a predetermined schedule to avoid stall conditions of the engine.

Referring then to Figure 2, there is shown the stall computer circuit in which the stall computer output winding 63 is inductively coupled to a rotor winding 127 connected across the main source of alternating current. The winding 127 is rotatably positioned relative to the output winding 63 by a shaft 129 driven by conventional two-phase motor 130 having a first winding connected by conductors 131 and 133 across the main source of alternating current and a control winding connected through conductors 135 and 137 to the output of a computer amplifier 139 which may be of conventional type.

The input to the computer amplifier includes grounded line 141 and a conductor 143 serially connected through a ram air temperature responsive winding 145 and turbine speed sensitive winding 147 and conductor 149 to conductor 67 leading serially to the temperature selector winding 61 through the stall computer output winding 63.

The speed sensitive winding 147 is inductively coupled to a rotor winding 151 connected across the main source of alternating current and adjustably positioned relative to the winding 147 and additional stator windings 153 and 155 by a shaft 157 positioned by speed responsive flyball governor 159. The governor 159 is in turn connected through the shaft 25 to the turbine driven shaft 22 so that the position of the rotor winding 151 in relation to the stator windings 147, 153 and 155 and thereby the voltage induced in such windings varies in relation to the speed of the turbine 20.

Inductively coupled with the ram air intake temperature sensitive winding 145 is a rotor winding 161 having one end thereof grounded by the conductor 163 while the opposite end is connected through a conductor 165 to the stator winding 153. The opposite end of the stator winding 153 is grounded by a conductor 167 so that winding 153 and 161 form a closed loop circuit. The speed responsive winding 151 will induce into the winding 153 a signal voltage depending upon the speed of the turbine 20 which signal voltage will be in turn induced by the winding 161 into the winding 145 in a value depending upon the adjusted position of the rotor winding 161 which is controlled through a flexible shaft 29 by the bimetallic ram air inlet sensitive device 28. The voltage induced in the speed sensitive winding 147 will act in opposition to the voltage induced in the temperature selector winding 61 while that induced in the compressor air inlet temperature sensitive winding 145 will be a function of speed and ram air inlet temperature and having a phase relationship acting in additive relation with the signal voltage induced in the turbine speed responsive winding 147.

In the event the additive voltage induced in the windings 147 and 145 exceeds the voltage induced in the temperature selector winding 61 indicating selection of a temperature within the stall range, the differential signal voltage applied to the stall computer amplifier 139 will then cause the actuator motor 130 to crank the rotor 127 as required to maintain a zero voltage around the reset loop, and thus reduce the selected temperature to the level dictated by the stall computer. The reverse action of increasing the selected temperature to the stall level is prevented by providing a zero stop means for the rotor 127. The zero stop means is shown schematically in Figure 2 as including an element 168 on shaft 129 cooperating with a fixed stop member 169 for preventing rotation of the rotor 127 in a sense to increase the combustion chamber temperature above the selected temperature value, while the rotor 127 is free to rotate within a limited range in a sense for decreasing the selected temperature when required so that the same may not exceed a ceiling value determined by the stall computer.

The stator windings 147 and 153 are so arranged in relation to the rotor winding 151 that as the compressor increases from idling to full throttle, the speed sensing device 159 first adjusts the rotor winding 151 so as to first tend to decrease the ceiling or maximum permissible temperature with increase in speed and then tends to increase the ceiling temperature with further increase in speed so as to match a predetermined ceiling schedule to avoid stall conditions dependent upon the characteristics of the particular engine controlled while the temperature sensing device 28 tends to increase the ceiling temperature as inlet temperature increases to match the ceiling schedule.

Selective auxiliary control circuits

As shown in Figure 2, the output of the mixing tube 87 is controlled by grid 85 biased by the temperature responsive control circuit described and by the grid 91.

In order to control the signal voltage applied to the grid 91 there are provided two auxiliary loop circuits which may alternately be selectively connected to the control grid 91 through operation of a gang switch 174 (Figure 1), including switch element 175 controlling contacts 176 and 177, switch element 179 controlling contacts 180 and 181, switch element 183 controlling contacts 184 and 185, and switch element 187 controlling contacts 188 and 189.

As shown in Figure 1, when the speed selector lever 51 is moved to its maximum speed selecting position, a projection 190 thereon is arranged to contact an arm 192 mounted on a shaft 194 for actuating in unison against the biasing force of a spring 196 the several switch elements 175, 179, 183 and 187 so as to close contacts 176, 180, 184 and 188 and open contacts 177, 181, 185 and 189 controlling the fuel regulators 27 and transfer the control of the respective fuel regulating valves 117 from a basic speed control to a separate temperature control as will be explained hereinafter. Within a lower speed range adjustment of the speed selector lever 51, the switch elements 175, 179, 183 and 187 are held by spring 196 in the position shown in Figure 1 closing contacts 177, 181, 185 and 189.

In normal operation, the speed selector lever 51 is adjusted to the maximum speed selection position and the switch elements 175, 179, 183 and 187, as shown in Figure 2, close the respective contacts 176, 180, 184 and 188, whereupon the control of the fuel regulating valve 117 is under basic temperature control in which the control grid 91 is biased by a signal voltage resulting from an off-speed coupling to give speed-temperature interaction stability, fuel valve position follow-up and reset signals to produce critical temperature damping and an over-and-under speed signal.

The auxiliary circuit affecting such signal voltage includes in serial relation the switch 175 closing contact 176, speed selector winding 198, speed stabilizing winding 155, switch 179 closing contact 180, speed limit winding 200, switch 183 closing contact 184, temperature reset winding 202, and temperature follow-up winding 204 ground connected at 206 to the input of the mixing tube 87 through the ground connection 94 of the battery 93.

Inductively coupled to the speed selector winding 198 is a rotary winding 210 connected across the source of alternating current and operatively positioned relative to the winding 198 through a shaft 212 positioned by the speed selector lever 52 which, as shown in Figure 2, is in the maximum speed selecting position. The winding 210 is arranged to induce into the winding 198 a voltage 180 degrees out of phase with the voltage induced in the winding 155 by the turbine speed responsive rotary winding 151. The voltage induced in winding 198 calls for the fuel valve 117 to close to effect a decrease in speed while the voltage induced in winding 155 calls for the fuel valve 117 to open to effect an increase in speed. As the winding 210 is adjusted to select maximum speed, the differential voltage induced in winding 155 normally calls for fuel valve 117 to open to effect an increase in speed and temperature until the maximum selected speed is attained when the voltage induced in winding 198 tends to hold the speed to the maximum selected speed subject; however, at all times to the action of the main temperature control circuit which applies a signal voltage to the grid 85 tending to hold the temperature within the selected temperature value subject to the monitoring effect of the stall computer.

The basic temperature control circuit is thus biased by an off-speed signal to give speed-temperature interaction stability.

Temperature follow-up

As shown in Figure 2, the motor 109, in addition to positioning the throttle valve 117 through shaft 115, also positions through a shaft 215 a rotor winding 217. The rotor winding 217 is connected through suitable conductors to the main source of alternating current. The winding 217 is further inductively coupled to the temperature follow-up stator winding 204 and a second stator winding 219. The winding 217 is arranged to induce in the winding 204 a voltage which is in phase with the voltage induced in the winding 198 and 180 degrees out of phase with the voltage induced in the winding 155 so as to tend to add to the voltage induced in the winding 198 a follow-up voltage which increases upon adjustment of the rotor winding 217 by the motor 109 in a valve 117 opening direction to increase fuel engine speed or temperature and tending to re-balance the differential or signal voltage across the lines 105 and 107 occuring upon unbalanced relation between the voltage induced in the windings 61 and 69 and windings 198 and 155. Upon a call for decrease in fuel engine speed and temperature the motor 217 is adjusted in an opposite valve closing direction and tending to decrease the additive effect of the voltage induced in the follow-up winding 204 and effecting a reverse follow-up action. The follow-up action aforenoted occurs relatively rapidly upon adjustment of the throttling valve 117 by the motor 109 to give a well damped control to the throttling valve 117.

Temperature reset action

A further temperature reset action is effected through operation of a temperature reset rotary winding 222 connected through suitable conductors across the main source of alternating current and inductively coupled to temperature reset winding 202 so as to induce a voltage therein which opposes the voltage in the temperature follow-up winding 204. The follow-up droop is removed by a slow speed reversible electrical reset motor 224 which drives the rotor winding 222 through a shaft 226 and in a direction to slowly remove the error between the selected temperature and the actual temperature introduced by the follow-up winding 204. The rotor winding 222 is relatively slowly adjusted by the motor 224 which may be of the conventional two-phase type having a winding connected through conductors 228 and 230 across the main source of alternating current and a control winding connected by conductors 232 and 234 to the output of an amplifier 236. The reset amplifier 236 may be of conventional type or may be of a type such as shown and described in U. S. Patent No. 2,493,605 granted January 3, 1950, to Adolph Warsher and assigned to Bendix Aviation Corporation.

The input to the amplifier 236 includes a grounded connection 238 and a conductor 240 connecting the input of the reset amplifier 236 in a loop circuit including temperature reset winding 202 and a temperature follow-up winding 204 so that a differential or reset signal voltage is induced across input lines 238 and 240 having a phase relationship dependent upon whether the fuel valve 117 has been adjusted in a fuel opening or fuel closing direction.

Thus the signal voltage applied by the amplifier 236 to the control winding of the motor 224 will cause rotation slowly of the rotor winding 222 in a direction to cause the induction in the temperature reset winding 202 of a reset voltage tending to oppose and wipe out the follow-up voltage induced in the winding 204. The voltage induced by the winding 217 in the winding 204 is opposite in phase to that induced in the winding 202 by the winding 222 so that the follow-up movement of the winding 217 to increase the voltage induced in the motor 224 will be followed up by a slow rotation of the rotor winding 222 in a direction to induce in the winding 202 an increase in voltage of opposite phase to tend to wipe out the follow-up voltage induced in the winding 204.

Over and under speed control

Inductively coupled to the speed limit control winding 200 is a rotary winding 250 connected by suitable conductors across the main source of alternating current. The rotary winding 250 is operatively positioned relative to the winding 200 by a rotatable shaft 252 to which there is secured at one end an arm 253 normally held by springs 254, as shown in Figure 3, in a neutral position at which the rotor winding 250 will induce zero voltage in the winding 200. A pin 255 carried by arm 256 of shaft 157 is arranged so that at the extreme of counterclockwise rotary movement of the arm 256 the pin 255 will strike the arm 253 at one side so as to actuate arm 253 against the force of springs 254 in a counterclockwise direction upon the shaft 157 being rotated by the flyball governor 159 in response to the speed of the turbine exceeding a pretermined maximum speed. In the latter arrangement, the drive relation between the shaft 157 and the rotary winding 250 is such that so long as the speed of the turbine does not exceed the maximum value, no controlling signal is induced by the winding 250 into the winding 200. However, upon the turbine speed exceeding the predetermined maximum safe value, the winding 250 is adjusted by the mechanism 252, 253, 255 and 256 into inductive relation with the winding 200 so as to induce therein a signal voltage affecting the control grid 91 in such a sense as to call for the motor 109 to actuate the fuel throttling valve 117 in a closing direction to decrease the speed of the turbine to within the predetermined safe value.

Figures 6, 7:
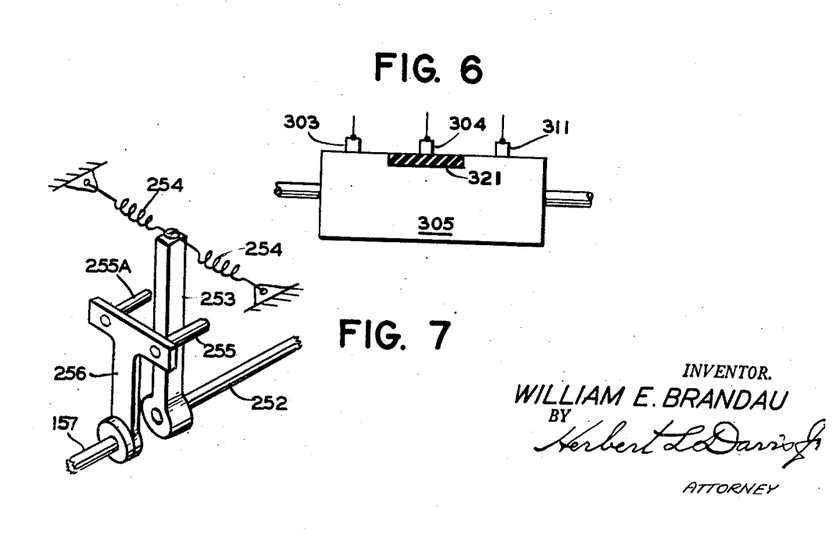
Figure 6 is a fragmentary schematic view illustrating the rotary starting switch in its final adjusted position after starting of the turbine engine has been effected.
Figure 7 is a fragmentary schematic drawing of a form of the speed limiting mechanism arranged to limit both overspeed and underspeed.

As shown in Figure 7, the arm 256 may be made in the form of a forked member with pins 255 and 255A arranged in spaced relation and at opposite sides of the arm 256 so that pin 255 may actuate arm 253 against the force of springs 254 in one direction upon the shaft 157 being rotated by the flyball governor 159 upon the turbine speed exceeding a predetermined maximum value, while pin 255A may actuate arm 253 against the force of springs 254 in an opposite direction upon the turbine speed decreasing below a predetermined minimum value. The mechanism 252—255A of Figure 7 serves to adjust the winding 250 into inductive relation with winding 200 so as to induce therein a signal voltage under minimum speed conditions of an opposite phase to that induced under excessive speed conditions and affecting the control grid 91 in such a sense as to call for the motor 109 to actuate the fuel throttling valve 117 in an opening direction to increase the speed of the turbine to within a safe value.

Operation of auxiliary circuit

It will be seen from the foregoing that the auxiliary circuit thus described will provide a bias on the control grid 91 which cooperates with the signal bias applied to the control grid 85 to give speed temperature interaction stability control and a value follow-up and reset effect to reduce critical damping and further through the action of the winding 200 an overspeed signal which decreases the speed and temperature setting of the regulator upon the speed of the turbine 20 exceeding a predetermined maximum value as during maneuvers of the plane and with the arrangement shown schematically in Figure 7 an underspeed signal which increases the speed and temperature setting of the regulator upon the speed of the turbine decreasing below a predetermined minimum value after landing. This occurs as a result of extremely low temperatures being selected during the landing approach in order to produce zero thrust while a windmilling torque is being applied through the propeller blading to the rotating masses. The windmilling torque disappears after landing and the engine would stall unless a higher temperature was scheduled to keep it running. This necessary higher temperature setting is accomplished by the resetting action of the low speed governor pin 255A.

Regulator speed selection operation

For starting ground idle and reverse pitch operation, the control is changed by manual switching (as the regulator speed selector lever 51 leaves its maximum position) to an entirely separate speed control system.

In the latter adjusted position of the lever 51, the gang switch 174, as shown by doted lines in Figure 2, causes the switch 175 to close the contact 177; the switch 179 to close contact 181; the switch 183 to close contact 185 and the switch 187 to close contact 189. In the latter adjusted arrangement of the several switch elements the contact 177 is grounded through a conductor 260 to connect one end of a speed control circuit to the input of an amplifier 262 through grounded connection 263. The opposite end of the speed control circuit loop is connected through switch 187 which now closes contact 189 to input conductor 265 of the speed amplifier 262. The speed control circuit includes the speed selector winding 198, the speed responsive winding 155, and the speed follow-up winding 219. As shown by dotted lines in Figure 2, in the latter circuit the switch 179 closes contact 181 and switch 187 closes contact 189.

It will be seen from the foregoing that the speed control circuit now acts through the speed amplifier 262 instead of controlling the bias on the control grid 91 of the mixing tube 87. In this circuit the selector winding 198, and speed responsive winding 155 act in the manner heretofore described and furthermore, there is induced in the speed follow-up winding 219 by the rotary winding 217 a follow-up voltage acting in opposition to the voltage induced in the speed responsive winding 155 in a manner similar to that of the winding 204 previously described which is now disconnected from the speed control circuit by the adjustment of switch 179 to close contact 181. There is thus provided in the last mentioned arrangement, a null seeking loop of selector voltage speed signal and valve follow-up voltage (without reset in this case in order to maintain a balance between the two power sections) which acts through the speed amplifier 262. The amplifier 262 may be of the conventional type or may be of a type such as shown and described in U. S. Patent No. 2,493,605, granted January 3, 1950, to Adolph Warsher and assigned to Bendix Aviation Corporation.

Output conductors 265 lead from the speed amplifier 262 to a phase selector indicated generally by the numeral 267 and which may be of a type such as disclosed in the copending application Serial No. 41,329 filed July 29, 1948, by William E. Brandau.

The phase selector 267 is so designed as to permit the passage of a signal voltage to output lines 269 and 270 of a phase corresponding to that induced in the winding 198 and indicative of an overspeed condition of the turbine 20, while preventing the passage of a signal voltage of an opposite phase or a phase corresponding to that induced in the winding 155 and indicative of an underspeed condition.

Thus a signal voltage calling for more fuel or temperature may be blocked out through action of the phase selector 267 while a signal voltage calling for a decrease in fuel or temperature upon the turbine speed being in excess of that selected through adjustment of the winding 210 may be passed through the phase selector 267 to output lines 269 and 270 to input lines 99 and 101 of the magnetic amplifier 103. The latter signal voltage serving to decrease the fuel and temperature of the engine is of sufficient amplitude as to override any signal voltage from the temperature responsive amplifier 97 tending to call for opening of the valve 117 to supply more fuel or increase the speed of the engine.

It will be seen then that the action of the phase selector 267 is such that underspeed signals are blocked and increased fuel voltage signals reach the servo motor 109 only in the form of an under-temperature signal through the temperature amplifier 197. Thus all operation on the speed circuit will be monitored during accelerations by the temperature setting on the stall computer.

It will be further seen that through adjustment of the switch 183 to close contact 185, as indicated by dotted lines in Figure 2, the temperature follow-up winding 204 and the temperature reset winding 202 will effect a follow-up and reset signal voltage bias on the control grid 91 of the mixing tube 87 as the fuel valve 117 is adjustably positioned through operation of the motor 109 by the temperature responsive system when the speed of the turbine 20 does not exceed the selected value. The aforedescribed features of the automatic fuel control device form the subject matter of the present application for patent.

*Starting operation*

The features of the applicant's novel engine starting device hereinafter explained form the subject matter described and claimed in the copending parent U. S. application for patent Serial No. 156,260 filed April 17, 1950, by William E. Brandau now Patent No. 2,727,356 issued December 20, 1955.

In starting, the regulator speed selector lever 51 is first adjusted to within a minimum speed selecting range, a further adjustment of the lever 42 to a minimum propeller speed and temperature selecting position will cause a starter switch 300 to be closed as shown in Figure 1.

Figure 4:
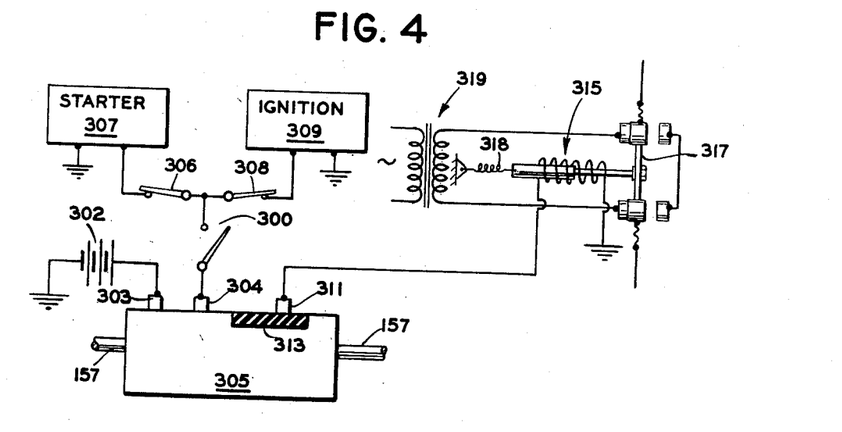
Figure 4 is a fragmentary schematic view illustrating the rotary starting switch in its initial position.
Figure 5:
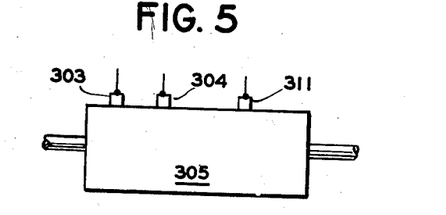
Figure 5 is a fragmentary schematic view illustrating the rotary starting switch in a second adjusted position.

The closing of switch 300 then completes a circuit, as shown in Figure 4, from a battery or source of electrical energy 302 through brushes 303 and 304 of a rotatable electrical conductive member 305, and a manually operated switch 306 to energize a starter indicated by the numeral 307 and through a manually operable switch 308 to energize an ignition device 309. The starter and ignition device are shown schematically and may be of conventional type. Energization of the starter imparts rotary movement to the turbine 20 of the engine in a conventional manner. Upon rotation of the turbine 20 reaching a predetermined minimum speed, the shaft 157 and thereby the rotary switch 305 is adjusted by the flyball governor 159 to the position shown in Figure 5 at which the brush 311 moves off an insulation strip 313 carried by the conductive member 305 of Figure 4 and closes through the conductive member 305 an additional circuit for energizing an electromagnet 315 to actuate switch 317 from the position shown in Figure 4 to the position shown in Figure 2 against the biasing force of a spring 318.

In the position shown in Figure 4, the switch 317 connects the input of the amplifier 262 through a transformer 319 to the main source of alternating current and providing a voltage phase causing motor 109 to rotate the fuel valve 117 to a closed position. The actuation of the switch 317 to the position shown in Figure 2 connects the line 265 through conductor 325 to the input of the amplifier 262 and permits rotation of the motor 109 in an opposite direction opening the fuel throttling valve 117 to the position called for by the regulating system in normal operation and permits ignition by the ignition device 309 of the fuel gases supplied the combustion chamber 12 through the throttling valve 117, whereupon the starting operation of the turbine is effected.

After the turbine has been brought to starting speed, further adjustment of the rotary switch 305 by the flyball governor 159 will cause the rotary switch 305 to break the circuit at brush 304 through an insulation strip 321 carried by the rotatable member 305, as shown in Figure 6. Upon the speed of the turbine reaching a desired speed, the same may be drivingly connected to the propeller shaft 38 by closing switch 39 to effect operation of associated clutch 35 so as to drivingly connect shaft 22 and the propeller shaft 38.

After one turbine 20 has been started and drivingly connected to the propeller shaft 38, the other turbine 20 may in turn be similarly started or in the alternative may be started by manually opening switch 306 and closing switch 308 of the ignition circuit for the other combustion chamber 12 and drivingly connecting the other turbine to the propeller shaft 38 through operation of the associated clutch 35 of the other turbine 20 by closing its control switch 39.

After the turbine engines have been started, the manual control 42 may be adjusted to open switch 300 and set the combustion chamber temperature and propeller speed to the desired values while the regulator speed control 51 may be shifted to the maximum setting thereupon actuating the gang switch 174 and shifting the basic control of the fuel valve 117 for both regulators from speed control to the normal basic temperature control as shown schematically in Figure 2.

Although only one embodiment of the invention has been illustrated and described, various changes in the form and relative arrangements of the parts may be made to suit requirements.

What is claimed is:

1. A control mechanism for an engine, comprising engine speed responsive regulating means, engine temperature responsive regulating means, engine fuel control means, means operatively connecting the second mentioned means to said fuel control means to effect a predetermined engine temperature, manually operable means effective at one adjusted position to selectively connect said first mentioned means to said fuel control means so as to control speed of the engine and effective at another adjusted position to selectively connect said first mentioned means to said fuel control means so as to maintain a stable condition of operation of the engine.

2. A control mechanism for an engine, comprising engine speed responsive regulating means, engine temperature responsive regulating means, engine fuel control means, means operatively connecting the second mentioned means to said fuel control means to effect a predetermined engine temperature, manually operable means effective at one adjusted position to selectively connect said first mentioned means to said fuel control means so as to control speed of the engine and effective at another adjusted position to selectively connect said first mentioned means to said fuel control means so as to maintain a stable condition of operation of the engine, means for changing the datum of one of said regulating means, and means interconnecting said datum changing means with said manually operable means for effecting the aforesaid selective connections of the first mentioned means to said fuel control means at predetermined settings of said one regulating means.

3. For use with an aircraft engine having a combustion chamber, an air intake conduit to said chamber, a fuel intake conduit to said chamber, a turbine driven by the combustion gases from said chamber, a compressor driven by said turbine to supply air to the intake conduit, and a valve to control the supply of fuel to said combustion chamber; the combination comprising a reversible electric motor for positioning said valve, a circuit for controlling the position of said valve through said motor so as to maintain the combustion chamber gases at a predetermined temperature, said circuit including first inductive coupling means responsive to the temperature of said combustion chamber gases, second inductive coupling means acting in opposition to said first inductive coupling means, manually operable means to adjust said second inductive coupling means to select said predetermined temperature, and a third inductive coupling means acting to limit the selected temperatures, motor means to adjust said third inductive coupling means, turbine speed responsive means, air intake temperature responsive means, and means operatively connecting said last two mentioned means to said motor means so as to vary the adjustment of said third inductive coupling means in response to air intake temperature and turbine speed.

4. For use with an engine having a combustion chamber, an air intake conduit to said chamber, a fuel intake conduit to said chamber, a turbine driven by the combustion gases from said chamber, a compressor driven by said turbine to supply air to the intake conduit, and a valve to control the supply of fuel to said combustion chamber; the combination comprising a reversible motor means for positioning said valve, means for controlling the position of said valve through said motor means, said last mentioned means including combustion chamber gas temperature responsive means for regulating the position of said valve through said motor means so as to normally maintain the temperature of the combustion chamber gas at a preselected value, manually operable means for varying said selected value, and limiting means, said limiting means including turbine speed responsive means and air intake temperature responsive means operatively interconnected with the manually operable means so as to limit the value of the selected combustion chamber temperature to a predetermined value dependent upon the turbine speed and air intake temperature.

5. For use with an engine having a combustion chamber, an air intake conduit to said chamber, a fuel intake conduit to said chamber, a turbine driven by the combustion gases from said chamber, a compressor driven by said turbine to supply air to the intake conduit, a valve to control the supply of fuel to said combustion chamber; the combination comprising a reversible motor means for positioning said valve, means for controlling the position of said valve through said motor means, said last mentioned means including an electrical circuit including a combustion chamber gas temperature responsive element for regulating the position of said valve through said motor means so as to normally maintain the temperature of the combustion chamber gas at a preselected value, manually operable means for varying said selected value, and means for variably limiting said selected value, means for operating said limiting means, said operating means including a turbine speed responsive means and air intake temperature responsive means jointly controlling said operating means so as to limit the selected value to a value below a predetermined compressor stall range.

6. The combination defined by claim 5 in which there is provided another electrical circuit including a turbine speed responsive element for regulating the position of said valve through said motor means so as to maintain the speed of said turbine below a preselected value, manually operable means for setting said selected speed value, and means permitting said other electrical circuit to affect said motor means only when the speed of said turbine exceeds said selected speed value so that the first mentioned electrical circuit including said temperature responsive element regulates the position of said valve through said motor means at speeds below said selected speed value and subject to said limiting means.

7. For use with an engine having a combustion chamber, an air intake conduit to said chamber, a fuel intake conduit to said chamber, a turbine driven by the combustion gases from said chamber, a compressor driven by said turbine to supply air to the air intake conduit, a device to regulate the supply of fuel to said combustion chamber to maintain a predetermined combustion chamber temperature, and operator-operative means to select said combustion chamber temperature; a stall computer to determine the maximum permissible combustion chamber temperature without compressor surge, comprising, in combination, a motor means, an electrical network for controlling said motor means, compressor speed responsive means, compressor air intake temperature responsive means, said electrical network controlled by said speed and temperature responsive means, and datum changing means operated by said motor means to decrease the selected temperature to a value permissible for avoiding surging of the compressor under the prevailing compressor speed and air intake temperature conditions.

8. The combination defined by claim 7 in which the electrical control network includes a first inductive coupling means operated by the compressor speed responsive means, a second inductive coupling means operated by the compressor air intake temperature responsive means, said first inductive coupling means to apply a speed signal to said second inductive coupling means, said second inductive coupling means to apply a temperature signal corrected by said speed signal to control said motor means, and said first and second inductive coupling means cooperating to control said motor means so as to operate the datum changing means in a sense to decrease the selected temperature to a value less than that of the stall region of said compressor as determined by the speed of said compressor and the compressor air intake temperature.

9. For use in controlling fuel supply to a supercharged engine having a combustion chamber; the combination comprising fuel regulating means for maintaining a selected combustion chamber temperature, supercharger speed responsive means, air intake temperature responsive means, an electrical network including control means operated by said speed and temperature responsive means, motor means controlled by said electrical network, and resetting means for changing the selected temperature of said regulating means, said resetting means operated by said motor means so as to decrease the selected temperature to a value permissible for avoiding the stall region of the compressor in accordance with prevailing compressor speed and air intake temperature conditions.

10. An electric control system for an engine comprising a first variable voltage signal circuit, means responsive to engine temperature to vary the signal voltage in the first circuit with change in engine temperature, a second variable voltage signal circuit, means responsive to engine speed to vary the signal voltage in the second circuit with change in engine speed, a reversible motor adapted to operate a control device affecting the engine speed and temperature, means operatively connecting said first signal circuit to said motor, and control means to selectively connect said second signal circuit to said motor.

11. The combination defined by claim 10 in which said control means includes means selectively operable for connecting said second signal circuit to said motor through the operative connecting means of said first signal circuit, and in which said control means includes other means alternately operable for connecting said second signal circuit to said motor, said other means including a selector device to operatively connect the second signal circuit to said motor only upon the speed of the engine exceeding a predetermined value so as to override the first signal circuit and cause said motor to operate the control device in an engine speed and temperature decreasing sense.

12. The combination defined by claim 10 in which said second signal circuit includes engine overspeed responsive means to override said first signal circuit upon the engine speed exceeding a predetermined value and cause said motor to operate the control device in an engine speed decreasing sense.

13. A control mechanism for an engine, comprising, in combination, a first electrical regulating circuit responsive to engine temperature, a second electrical regulating circuit responsive to engine speed, a valve for regulating the fuel to the engine, a reversible electric motor for positioning said valve, means operatively connecting said first and second regulating circuits to said electric motor to control the direction of rotation of said motor and thereby the position of said fuel regulating valve to effect speed-temperature regulation, said engine speed responsive circuit including means effective upon an engine speed over a predetermined maximum value and under a predetermined minimum value to affect said connecting means so as to maintain the engine speed within the maximum and minimum speed limits.

14. A control mechanism for an engine, comprising, in combination, a first electrical regulating circuit responsive to engine temperature, a second electrical regulating circuit responsive to engine speed, a valve for regulating the fuel to the engine, a reversible electric motor for positioning said valve, means operatively connecting said first and second regulating circuits to said electric motor to control the direction of rotation of said motor and thereby the position of said fuel regulating valve to effect speed-temperature regulation, the second regulating circuit including a first variable induction transformer, a device responsive to engine speed operatively connected to said first transformer to vary the inductive effect of the first transformer with engine speed, a second variable induction transformer acting in opposition to said first transformer, manually operable means to adjust the inductive effect of said second transformer, a third variable induction transformer normally ineffective in said second regulating circuit, mechanical coupling means for operatively connecting said speed responsive device to said third transformer upon the speed of said engine exceeding a predetermined maximum value and upon the speed of said engine decreasing below a predetermined minimum value to adjust the inductive effect of said third transformer in a sense to cause said second circuit to affect the connecting means to maintain the engine speed within the maximum and minimum speed limits.

15. A control mechanism for an engine, comprising, in combination, a first electrical regulating circuit responsive to engine temperature, a second electrical regulating circuit responsive to engine speed, a valve for regulating the fuel to the engine, a reversible electric motor for positioning said valve, means operatively connecting said first and second regulating circuits to said electric motor to control the direction of rotation of said motor and thereby the position of said fuel regulating valve to effect speed-temperature regulation, the first regulating circuit including means for varying the datum of said first regulating circuit, means for operating said datum varying means, an engine speed responsive means, an ambient air temperature responsive means, and means operatively connecting said speed and temperature responsive means to said operating means to control the operation of said datum varying means so as to maintain the regulated temperature within a predetermined limited range.

References Cited in the file of this patent

UNITED STATES PATENTS

| | | |
|---|---|---|
| 944,394 | Whittaker | Dec. 28, 1909 |
| 2,336,052 | Anderson | Dec. 7, 1943 |
| 2,336,232 | Doran | Dec. 7, 1943 |
| 2,545,856 | Orr | Mar. 20, 1951 |
| 2,557,526 | Bobier et al. | June 19, 1951 |
| 2,558,592 | Starkey et al. | June 26, 1951 |
| 2,564,107 | Holley | Aug. 14, 1951 |
| 2,581,275 | Mock | Jan. 1, 1952 |
| 2,606,420 | Moore | Aug. 12, 1952 |
| 2,697,908 | Offner | Dec. 28, 1954 |

FOREIGN PATENTS

| | | |
|---|---|---|
| 926,065 | France | Apr. 14, 1947 |